(12) United States Patent
   Kim

(10) Patent No.:   US 12,600,401 B2
(45) Date of Patent:       Apr. 14, 2026

(54) STEERING SHAFT CONNECTING STRUCTURE OF ELECTRIC POWER STEERING

(71) Applicant: HL MANDO CORPORATION, Pyeongtaek-si (KR)

(72) Inventor: Jinnam Kim, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 404 days.

(21) Appl. No.: 18/094,110

(22) Filed: Jan. 6, 2023

(65) Prior Publication Data

US 2023/0219616 A1    Jul. 13, 2023

(30) Foreign Application Priority Data

Jan. 10, 2022    (KR) ......................... 10-2022-0003215

(51) Int. Cl.
   *B62D 5/04*          (2006.01)
   *B62D 1/20*          (2006.01)
   (Continued)

(52) U.S. Cl.
   CPC ............. *B62D 5/0403* (2013.01); *B62D 1/20* (2013.01); *F16D 1/02* (2013.01); *F16H 57/021* (2013.01);
   (Continued)

(58) Field of Classification Search
   CPC ... B62D 1/20; B62D 3/02; B62D 3/04; B62D 3/06; B62D 3/08; B62D 5/0403;
   (Continued)

(56) References Cited

U.S. PATENT DOCUMENTS 5,369,583  A  *  11/1994  Hazelden ................ G01L 5/221
                                                                      702/41
5,844,386  A  *  12/1998  Matsuoka .............. H02K 11/40
                                                                      361/717
(Continued)

FOREIGN PATENT DOCUMENTS

DE         102011054983  A1  *    5/2013  ............... B62D 6/10
DE         102012109125  A1  *    3/2014  ............... F16D 1/112
(Continued)

OTHER PUBLICATIONS

Translation of KR 10-023909. Jidosha Kiki Co. Jan. 15, 2000.*
(Continued)

*Primary Examiner* — Josh Skroupa
(74) *Attorney, Agent, or Firm* — Hauptman Ham, LLP

(57) ABSTRACT

A structure of an electric power steering device in which its steering shafts are connected includes a torsion bar connected to a steering wheel; an input shaft surrounding the torsion bar on an input side of the torsion bar; and an output shaft surrounding one end of the input shaft and the torsion bar on an output side of the torsion bar, wherein the one end of the input shaft is inserted into and coupled to one end of the output shaft, and a copper bush and a needle bearing are disposed side by side between an outer circumferential surface of the one end of the input shaft and an inner circumferential surface of the one end of the output shaft.

6 Claims, 6 Drawing Sheets

(51) Int. Cl.
  *F16D 1/02* (2006.01)
  *F16H 57/00* (2012.01)
  *F16H 57/02* (2012.01)
  *F16H 57/021* (2012.01)

(52) U.S. Cl.
  CPC ........ *B62D 5/0409* (2013.01); *F16D 2300/22* (2013.01); *F16H 57/0006* (2013.01); *F16H 2057/02034* (2013.01)

(58) Field of Classification Search
  CPC .. B62D 5/0406; B62D 5/0409; B62D 5/0412; B62D 5/0415; B62D 55/108; B62D 55/1083; F16D 1/02; F16D 3/12; F16D 2300/22; F16F 1/14; F16F 1/145; F16F 1/16; F16H 57/0006; F16H 57/021; F16H 2025/2012; F16H 2057/02034; F16H 2057/02082; Y10T 403/21; Y10T 403/213; Y10T 403/217; Y10T 403/55; Y10T 403/59
  USPC ................ 403/28, 29, 30, 292, 298; 464/97
  See application file for complete search history.

(56) References Cited

U.S. PATENT DOCUMENTS

| | | | | |
|---|---|---|---|---|
| 6,044,723 A | * | 4/2000 | Eda ...................... | B62D 5/0409 74/411 |
| 8,109,183 B2 | * | 2/2012 | Santamarina ....... | B25B 23/1405 81/477 |
| 9,387,873 B2 | * | 7/2016 | Kiyota ................ | B62D 5/0403 |
| 9,669,865 B2 | * | 6/2017 | Schröder ............. | B62D 5/0409 |
| 10,137,926 B2 | * | 11/2018 | Strobel .................... | B62D 5/0409 |
| 11,466,724 B2 | * | 10/2022 | Butler ...................... | F16D 3/10 |
| 2009/0311061 A1 | | 12/2009 | Santamarina et al. | |

FOREIGN PATENT DOCUMENTS

| | | | | | |
|---|---|---|---|---|---|
| DE | 102015002686 A1 | * | 9/2016 | .......... | B62D 5/0409 |
| GB | 459575 A | * | 1/1937 | .............. | F16F 1/16 |
| KR | 10-1997-0074475 A | | 12/1997 | | |
| KR | 10-0239909 B1 | | 1/2000 | | |
| KR | 2002-0054089 A | | 7/2002 | | |
| KR | 10-2008-0039596 A | | 5/2008 | | |
| KR | 20120075780 A | * | 7/2012 | .......... | B62D 5/0409 |
| KR | 10-2020-0040376 A | | 4/2020 | | |
| KR | 10-2208240 B | | 1/2021 | | |
| WO | WO-2006048392 A1 | * | 5/2006 | .............. | B62D 6/10 |

OTHER PUBLICATIONS

Translation of KR 2002-0054089. Mando Corporation. Jul. 6, 2002.*
Translation of KR 10-2008-0039596. Namyang Ind Co LTD. May 7, 2008.*
Office Action dated Feb. 27, 2026 for corresponding Korean Patent Application No. 10-2022-0003215, along with an English machine translation (11 pages).

* cited by examiner

STEERING SHAFT CONNECTING STRUCTURE OF ELECTRIC POWER STEERING

CROSS-REFERENCE TO RELATED APPLICATIONS

This application claims benefit and priority to Korean Patent Application No. 10-2022-0003215, filed on Jan. 10, 2022, with the Korean Intellectual Property Office, the disclosure of which is incorporated herein in its entirety by reference.

TECHNICAL FIELD

The present disclosure relates to a steering shaft connecting structure of an electric power steering (EPS) device, and, more particularly, to a steering shaft connecting structure of the EPS device, which may deliver improved performance for reducing noise, vibration, and harshness (NVH) at low temperatures.

BACKGROUND

In general, a vehicle steering system is a device provided in a vehicle so that a driver can turn a vehicle in a desired direction by controlling a steering wheel provided in front of a driver's seat.

The vehicle steering system includes a steering wheel provided in front of a driver's seat of a vehicle, a steering shaft connected to a lower part of the steering wheel, a steering column fixed to the vehicle body through a pair of mounting brackets with the steering shaft installed inside, a gearbox installed to be throttled through a universal joint at a lower end of the steering shaft, etc., in order to transmit the rotational force of the steering shaft while being inclined at a certain angle.

The steering column has the telescopic and tilting functions. Through these functions, a driver can adjust the degree of protrusion and the angle of inclination of the steering wheel according to his/her height or body shape in order to smoothly operate the steering wheel.

The steering shaft has various structures for absorbing energy to retract in an axial direction when external impacting energy is transmitted, and the steering column installed outside it is also designed to retract in an axial direction with it.

An electric power steering (EPS) device is a device for steering a vehicle as desired by a driver and delivering optimal steering performance by highly precisely controlling a motor based on conditions of the vehicle without using the existing hydraulic system.

The EPS device has a disadvantage of generating noise, and a structure for preventing noise has been disclosed in Patent Document 1, Korean Patent Application Publication No. 10-2020-0040376 (published on Apr. 20, 2020).

Hereinafter, with reference to FIGS. 1 and 2, disadvantages of the conventional internal shaft connecting structure of the EPS device will be described.

Referring to FIG. 1, the conventional internal shaft connecting structure of the EPS device will be described. A torsion bar 10 connected to a steering wheel (not shown) may be surrounded by an input shaft 20 and an output shaft 30. One end of the input shaft 20 may be inserted into and coupled to one end of the output shaft 30, and there may be a copper bush 51 inserted between an outer circumferential surface of the input shaft 20 and an inner circumferential surface of the output shaft 30. Since the copper bush 51 may not serve to support the weight, the assembly of the input shaft 20 and the output shaft 30 may be supported by a column lower bearing 41 at the end of the input shaft 20, and both ends of the output shaft 30 may be supported by a gearbox housing bearing 42 and a housing cover bearing 43, respectively.

The weight W of a reducer applied to the output shaft 30 may be supported as a supported weight F1 by the gearbox housing bearing 42 and as a supported weight F2 by the housing cover bearing 43.

The internal shaft connecting structure of the EPS device as shown in FIG. 1 may require as many as three bearings for supporting the weight, so it may have disadvantages in that the production cost and the weight of the EPS device is high and the packaging thereof is not easy.

As a structure for reducing the production cost and the weight and facilitating the packaging, an internal shaft connecting structure of the EPS device as shown in FIG. 2 has been proposed.

The assembly of the input shaft 20 and the output shaft 30 may be externally supported by the column lower bearing 41 at the end of the input shaft 20 and may be externally supported by the gearbox housing bearing 42 at the end of the output shaft 30. Between the outer circumferential surface of the input shaft 20 and the inner circumferential surface of the output shaft 30, there may be two needle bearings 52 inserted instead of the copper bush 51 in FIG. 1. That is, the gear box housing bearing 42 and the column lower bearing 41 may support the output shaft 30 and the input shaft 20 connected by the needle bearings 52, respectively. The needle bearing 52 may be a component for reducing rotational frictional force, and may support the bending weight M unlike the copper bush 51 in FIG. 1. In other words, the weight W of a reducer applied to the outside of the assembly of the input shaft 20 and the output shaft 30 may be supported as a supported weight F3 by the gearbox housing bearing 42 and may be supported as a supported weight F4 by the column lower bearing 41, and, inside, the bending weight M may be supported by the needle bearings 52.

However, the internal shaft connecting structure of the EPS device to which the needle bearing is applied as shown in FIG. 2 may have a problem in that loud noise may be generated when steering is reversed at low temperatures.

Therefore, it is necessary to develop an internal shaft connecting structure of the EPS device, through which it is possible to cut down the production cost and the weight and facilitate the packaging while reducing vibration and noise at low temperatures.

RELATED ART LITERATURE

Patent Literature (Patent Literature 1) Korean Patent Application Publication No. 10-2020-0040376 (published on Apr. 20, 2020)

SUMMARY

The present disclosure was derived to solve the above-mentioned problems of the related art, and the purpose of the present disclosure is to provide an internal shaft connecting structure of an electric power steering (EPS) device, through which it is possible to cut down the production cost and the weight and facilitate the packaging while reducing vibration and noise at low temperatures.

To solve the above-mentioned problems, a steering shaft connecting structure of the EPS device according to an embodiment of the present disclosure may include a torsion bar connected to a steering wheel; an input shaft surrounding the torsion bar on an input side of the torsion bar; and an output shaft surrounding one end of the input shaft and the torsion bar on an output side of the torsion bar, wherein the one end of the input shaft may be inserted into and coupled to one end of the output shaft, and a copper bush and a needle bearing may be disposed side by side between an outer circumferential surface of the one end of the input shaft and an inner circumferential surface of the one end of the output shaft.

The other end of the input shaft may be externally supported by a column lower bearing.

The output shaft may be externally supported by a gearbox housing bearing.

When a low weight is applied at room temperature, only the needle bearing may support the weight.

When a high weight is applied at room temperature, the copper bush may come into contact with the outside of the input shaft so that both the needle bearing and the copper bush may support the weight.

The rotational frictional force may increase as the copper bush thermally contracts at a low temperature.

A steering shaft connecting structure of the EPS device according to another embodiment of the present disclosure may include a torsion bar connected to a steering wheel; an input shaft surrounding the torsion bar on an input side of the torsion bar; and an output shaft surrounding one end of the input shaft and the torsion bar on an output side of the torsion bar, wherein the one end of the input shaft may be inserted into and coupled to one end of the output shaft, and a needle bearing and a copper bush surrounding the needle bearing may be disposed between an outer circumferential surface of the one end of the input shaft and an inner circumferential surface of the one end of the output shaft.

When a low weight is applied at room temperature, only the needle bearing may support the weight.

When a high weight is applied at room temperature, the copper bush may come into contact with the outside of the needle bearing so that both the needle bearing and the copper bush may support the weight.

Two needle bearings may be disposed side by side.

The copper bush may surround both of the two needle bearings.

Through the steering shaft connecting structure of the EPS device according to the present disclosure as above, it may be possible to cut down the production cost and the weight and facilitate the packaging while reducing vibration and noise at low temperatures.

DETAILED DESCRIPTION

When needle bearings are applied to an internal shaft connecting structure of an electric power steering (EPS) device, excessive popping noise may be generated when steering is reversed at low temperatures. In the present disclosure, an enhanced internal shaft connecting structure of the EPS device is suggested by analyzing a mechanism in which such noise is generated.

Figure 1:
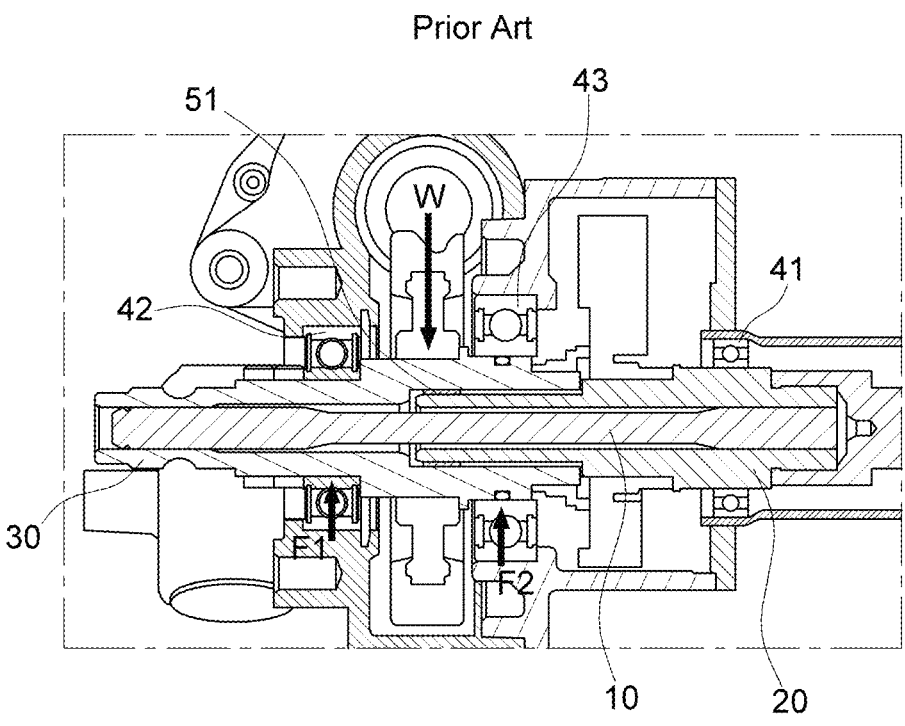
FIG. 1 is a view showing an example of the conventional internal shaft connecting structure of the EPS device.
Figure 2:
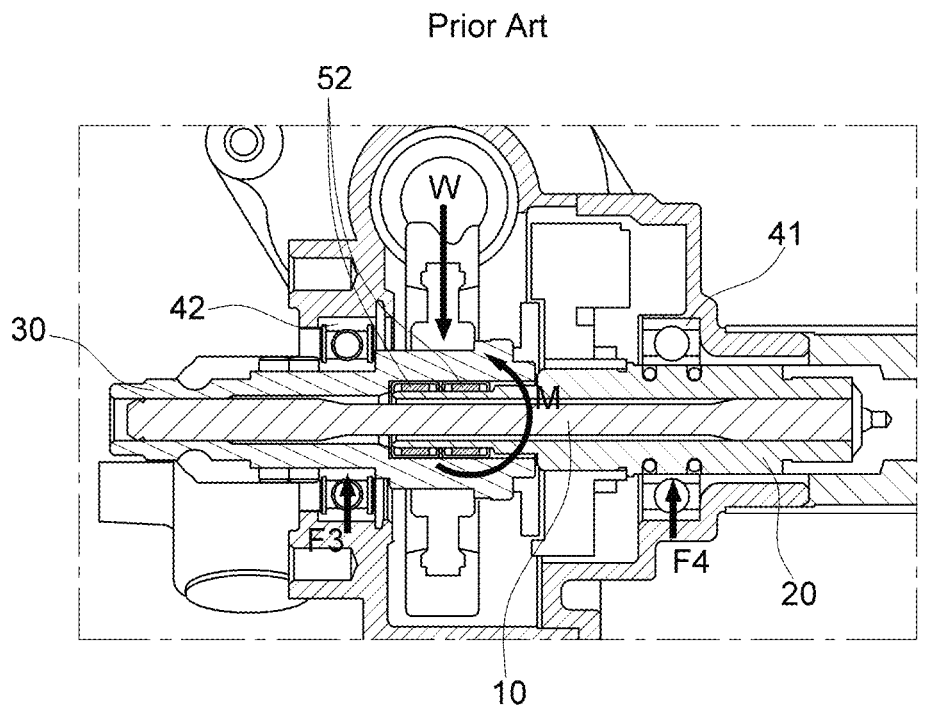
FIG. 2 is a view showing another example of the conventional internal shaft connecting structure of the EPS device.
Figure 3:
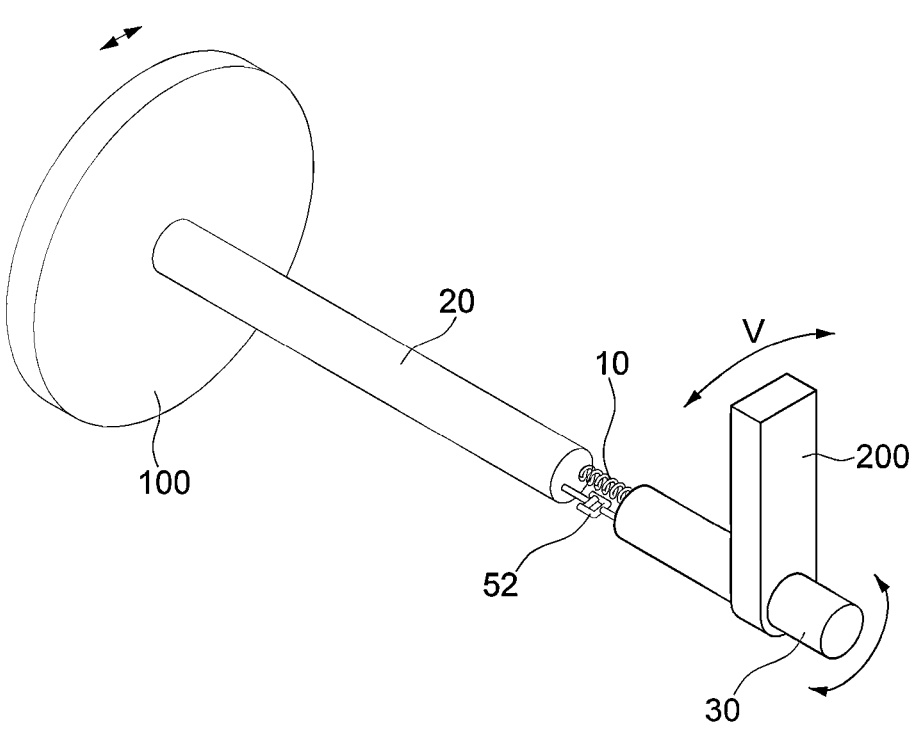
FIG. 3 is a view showing a modeling of an internal shaft connecting structure of the EPS device where an input shaft and an output shaft are connected by a needle bearing.
Figure 4:
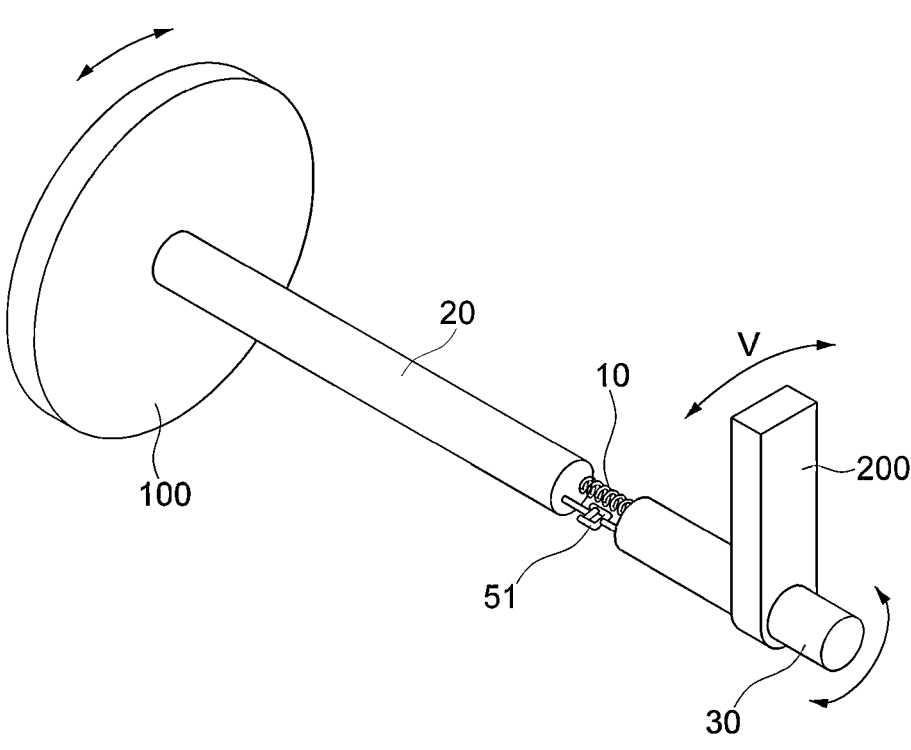
FIG. 4 is a view showing a modeling of an internal shaft connecting structure of the EPS device where the input shaft and the output shaft are connected by a copper bush.

FIG. 3 shows a simplified modeling of an internal shaft connecting structure of the EPS device where an input shaft and an output shaft are connected by a needle bearing, and FIG. 4 shows a simplified modeling of an internal shaft connecting structure of the EPS device where the input shaft and the output shaft are connected by a copper bush.

When a worm wheel 200 contracts at a low temperature, a gap may appear in a reducer. As a unit rotational torque is lowered, the gap in the reducer may widen.

When the needle bearing 52 is applied at a low temperature (FIG. 3), the change in the rotational frictional force may be insignificant, and, when the copper bush 51 is applied (FIG. 4), the frictional force may greatly increase due to the shrinkage of the inner diameter of the copper bush.

When the needle bearing 52 is applied as shown in FIG. 3, a gap in a reducer may widen at low temperatures so that the worm wheel 200 on the output side may easily vibrate, resulting in popping noise and rattling noise during steering reversal. In this case, the bushing frictional force at room temperature and low temperature may be the same.

When the copper bush 51 is applied as shown in FIG. 4, no noise may be generated at low temperatures because the frictional force of the copper bush 51 may increase. When the frictional force of the bushing increases at low temperatures, a steering wheel 100 may hold the worm wheel 200 so that the mass of the shaft of the worm wheel may increase. That is, with the same gap in a reducer, when the frictional force of the bushing increases at a low temperature, the inertia of the steering wheel may affect the shaft of the worm wheel so that the mass of the shaft of the worm wheel may increase.

In the present disclosure, there may be proposed a shaft connecting structure, which is to prevent noise at low temperatures when the needle bearing is applied to an internal shaft connecting structure of the EPS device.

Figure 5:
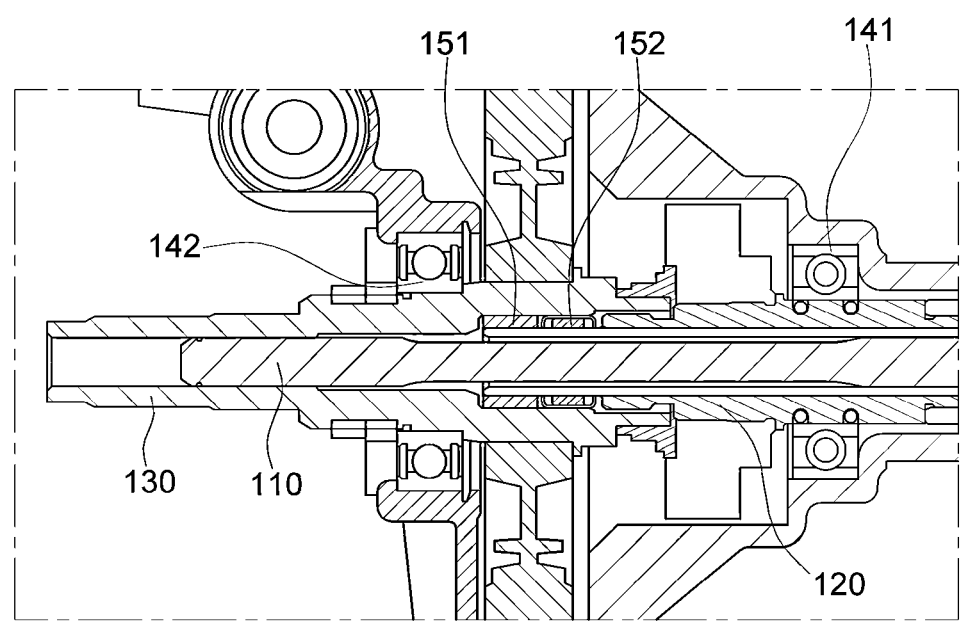
FIG. 5 is a view showing an internal shaft connecting structure of the EPS device according to an embodiment of the present disclosure.
Figure 6:
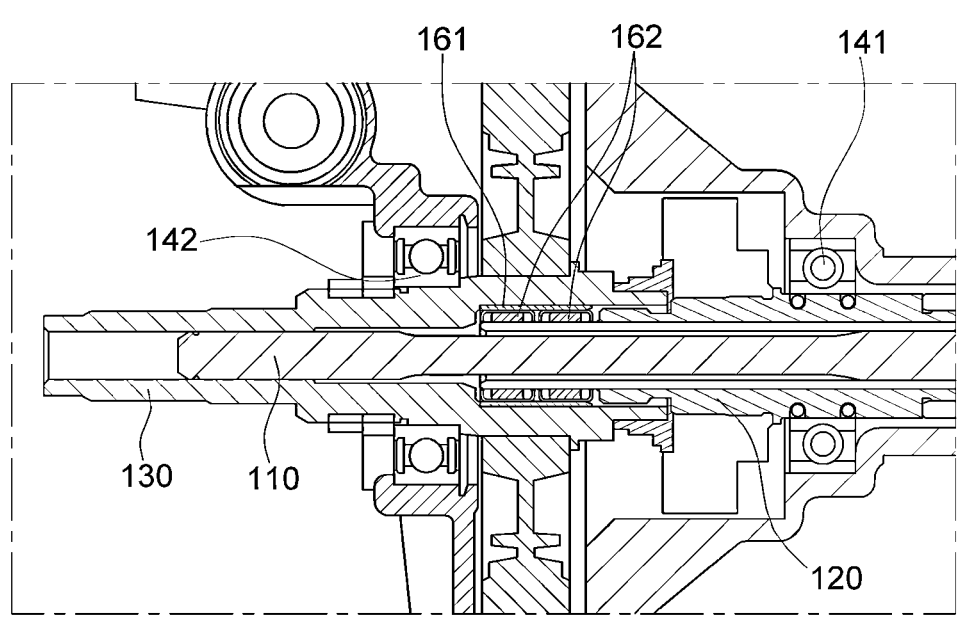
FIG. 6 is a view showing an internal shaft connecting structure of the EPS device according to another embodiment of the present disclosure.

Hereinafter, with reference to FIGS. 5 and 6, an internal shaft connecting structure of the EPS device having an improved function of preventing noise at low temperatures according to the present disclosure will be described in detail. FIG. 5 shows an internal shaft connecting structure of the EPS device according to an embodiment of the present disclosure, and FIG. 6 shows an internal shaft connecting structure of the EPS device according to another embodiment of the present disclosure.

FIG. 5 shows an internal shaft connecting structure of the EPS device in which an input shaft 120 and an output shaft 130 are coupled by a copper bush 151 and a needle bearing 152 arranged side by side.

A torsion bar 110 connected to a steering wheel (not shown) may be surrounded by the input shaft 120 on the input side, and may be surrounded by the output shaft 130 together with one end (on the left in FIG. 5) of the input shaft 120 on the output side. The one end of the input shaft 120 may be inserted into and coupled to one end of the output shaft 130 (a right side of the output shaft in FIG. 5), and, between an outer circumferential surface of the one end of the input shaft 120 and an inner circumferential surface of the one end of the output shaft 130, the copper bush 151 and the needle bearing 152 may be arranged side by side.

The assembly of the input shaft 120 and the output shaft 130 may be externally supported by a column lower bearing 141 at the other end of the input shaft 120 (on the right in FIG. 5), and may be externally supported by a gearbox housing bearing 142 at the output shaft 130. Between the outer circumferential surface of the input shaft 120 and the inner circumferential surface of the output shaft 130, there may be the copper bush 151 and the needle bearing 152 inserted side by side.

When a low weight is applied at room temperature, only the needle bearing 152 may serve to support the weight, and the rotational frictional force may be low. When a high weight is applied at room temperature, the copper bush 151 may come into contact with the outside of the input shaft 120 so that both the needle bearing 152 and the copper bush 151 may serve to support the weight.

On the other hand, since the copper bush 151 may thermally contract at a low temperature so that the rotational frictional force may increase, it may be possible to prevent noise and vibration that may occur at a low temperature.

That is, in the internal shaft connecting structure of the EPS device according to the embodiment in FIG. 5, the input shaft 120 and the output shaft 130 may be coupled by the copper bush 151 and the needle bearing 152; when a high weight is applied at room temperature, both the needle bearing 152 and the copper bush 151 may support the weight so that it may be possible to sufficiently support the weight; and it may possible to prevent noise and vibration by thermal contraction of the copper bush 151 at low temperatures.

FIG. 6 shows an internal shaft connecting structure of the EPS device in which the input shaft 120 and the output shaft 130 may be coupled by a needle bearing 162 and a copper bush 161 surrounding the needle bearing 162.

The needle bearing 162 and the copper bush 161 surrounding the needle bearing 162 may be press-fitted between the outer circumferential surface of the input shaft 120 and the inner circumferential surface of the output shaft 130. Here, one needle bearing 162 may be disposed, or two may be disposed side by side. FIG. 6 shows an embodiment in which two needle bearings 162 are disposed side by side. When two needle bearings 162 are disposed side by side, it may be desirable to from the copper bush 161 surrounding them to a size sufficient to surround both of the two needle bearings 162.

The assembly of the input shaft 120 and the output shaft 130 may be externally supported by the column lower bearing 141 at one end of the input shaft 120, and may be externally supported by the gearbox housing bearing 142 at the end of the output shaft 130.

When a low weight is applied at room temperature, only the needle bearing 162 may serve to support the weight, and the rotational frictional force may be low. When a high weight is applied at room temperature, the copper bush 161 may come into contact with the outside of the needle bearing 162 so that both the needle bearing 162 and the copper bush 161 may serve to support the weight.

Meanwhile, since the copper bush 161 may thermally contract at a low temperature so that the rotational frictional force may increase, it may be possible to prevent noise and vibration that may occur at a low temperature.

That is, in the internal shaft connecting structure of the EPS device according to the embodiment in FIG. 6, the input shaft 120 and the output shaft 130 may be coupled by the needle bearing 162 and the copper bush 161 surrounding the needle bearing 162; when a high weight is applied at room temperature, both the needle bearing 162 and the copper bush 161 may support the weight so that it may be possible to sufficiently support the weight; and it may possible to prevent noise and vibration by thermal contraction of the copper bush 161 at low temperatures.

In terms of product cost reduction, the embodiment of FIG. 5 may be more desirable than the embodiment in FIG. 6 because the unit price of the copper bush is lower than that of the needle bearing.

The description above is only an exemplary description of the technology of the present disclosure, and various modifications, changes, and substitutions within the scope of the essential characteristics of the present disclosure will be possible to a person having ordinary skill in the technical field to which the present disclosure belongs. Therefore, the embodiments described above are not intended to limit the technology of the present disclosure, but to explain, and the scope of the technology of the present disclosure is not limited by the embodiments. The scope of the present disclosure should be determined based on the following claims, and all technologies within the scope equivalent thereto should be deemed to be included in the scope of the present disclosure.

What is claimed is:

1. A steering shaft connecting structure of an electric power steering device, comprising:
   a torsion bar connected to a steering wheel;
   an input shaft surrounding the torsion bar on an input side of the torsion bar; and
   an output shaft surrounding one end of the input shaft and the torsion bar on an output side of the torsion bar,
   wherein the one end of the input shaft is inserted into and coupled to one end of the output shaft, and a copper bush and a needle bearing are disposed side by side between an outer circumferential surface of the one end of the input shaft and an inner circumferential surface of the one end of the output shaft.

2. The steering shaft connecting structure of claim 1, wherein the other end of the input shaft is externally supported by a column lower bearing.

3. The steering shaft connecting structure of claim 2, wherein the output shaft is externally supported by a gearbox housing bearing.

4. The steering shaft connecting structure of claim 3, wherein the needle bearing and the copper bush are arranged relatively adjacent to a gearbox housing bearing than the column lower bearing.

5. The steering shaft connecting structure of claim 2, wherein the needle bearing is arranged relatively adjacent to the column lower bearing than the copper bush.

6. The steering shaft connecting structure of claim 1, wherein the copper bush and the needle bearing are disposed in a direction parallel to a longitudinal direction of the torsion bar.

* * * * *